(12) United States Patent
Okuto et al.

(10) Patent No.: US 7,816,057 B2
(45) Date of Patent: Oct. 19, 2010

(54) FUEL SUPPLY METHOD FOR DIRECT METHANOL FUEL CELL

(75) Inventors: Tadashi Okuto, New York, NY (US); Ioannis Milios, New York, NY (US)

(73) Assignee: Sendyne Corporation, New York, NY (US)

( * ) Notice: Subject to any disclaimer, the term of this patent is extended or adjusted under 35 U.S.C. 154(b) by 536 days.

(21) Appl. No.: 10/528,513

(22) PCT Filed: Jan. 15, 2004

(86) PCT No.: PCT/US2004/001553

§ 371 (c)(1),
(2), (4) Date: Mar. 18, 2005

(87) PCT Pub. No.: WO2004/066468

PCT Pub. Date: Aug. 5, 2004

(65) Prior Publication Data

US 2006/0019141 A1    Jan. 26, 2006

Related U.S. Application Data

(60) Provisional application No. 60/440,657, filed on Jan. 15, 2003.

(51) Int. Cl.
  *H01M 8/04* (2006.01)
(52) U.S. Cl. ............... 429/515; 429/516; 429/569; 429/512; 429/456; 429/462
(58) Field of Classification Search .......... 429/34, 429/30, 13, 38
See application file for complete search history.

(56) References Cited

U.S. PATENT DOCUMENTS

| 4,537,840 | A | 8/1985 | Tsukui et al. |
| 4,562,123 | A | 12/1985 | Shimizu et al. |
| 5,432,023 | A | 7/1995 | Yamada et al. |
| 6,630,266 | B2 | 10/2003 | Hockaday et al. |
| 6,696,189 | B2 | 2/2004 | Bostaph et al. |
| 6,737,181 | B2 * | 5/2004 | Beckmann et al. ............ 429/13 |
| 6,908,500 | B2 * | 6/2005 | Fisher et al. ...................... 96/6 |

(Continued)

FOREIGN PATENT DOCUMENTS

EP    1087455    3/2001

(Continued)

OTHER PUBLICATIONS http://www.webster-dictionary.org/definition/adjacent.*

(Continued)

*Primary Examiner*—Dah-Wei Yuan
*Assistant Examiner*—Angela J. Martin
(74) *Attorney, Agent, or Firm*—Oppedahl Patent Law Firm LLC

(57) ABSTRACT

In a direct methanol fuel cell, fuel efficiency is maintained by periodically adding a higher methanol concentration mixture through a cartridge into the primary fuel container. The cartridge replenishes methanol and partial water losses due to the consumption of fuel in the power generating process. In a typical system, the fuel replenishment mechanism is controlled through an electronic apparatus that monitors the power conversion process and is capable of predicting remaining operating capacity.

8 Claims, 5 Drawing Sheets

U.S. PATENT DOCUMENTS

| | | |
|---|---|---|
| 6,981,877 B2 * | 1/2006 | Ren et al. .................... 439/34 |
| 2001/0049045 A1 | 12/2001 | Hockaday |
| 2002/0076589 A1 | 6/2002 | Bostaph |
| 2004/0072049 A1 * | 4/2004 | Becerra et al. ................ 429/34 |

FOREIGN PATENT DOCUMENTS

| | | |
|---|---|---|
| JP | H02-234358 A | 9/1990 |
| JP | H04-229975 A | 8/1992 |
| JP | 2001-508919 A | 7/1998 |
| JP | 2001-238903 A | 9/2001 |
| JP | 2002-203587 A | 7/2002 |
| WO | WO02071520 | 9/2002 |

OTHER PUBLICATIONS

Supplementary European Search Report Dec. 15, 2008.

* cited by examiner

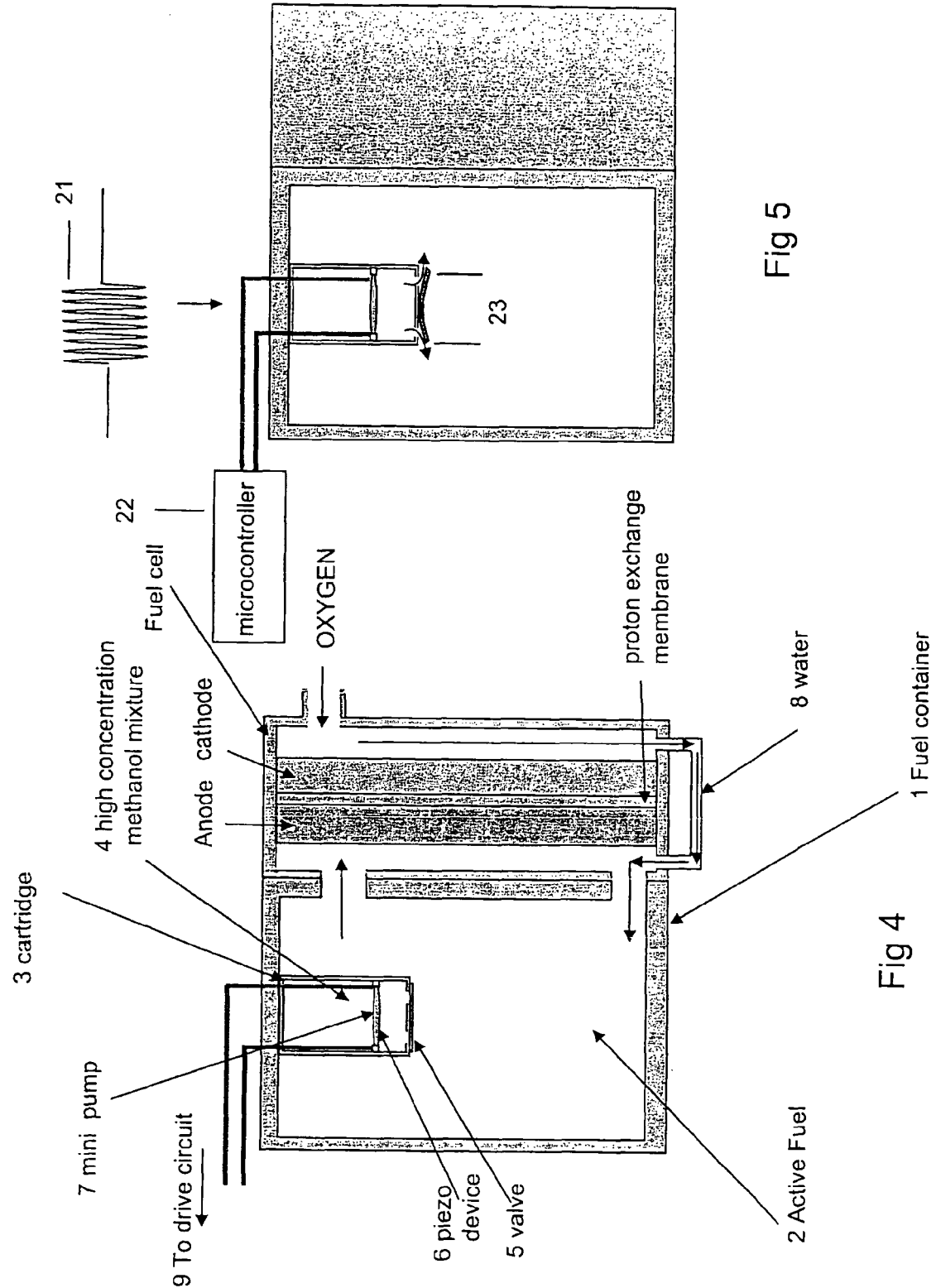

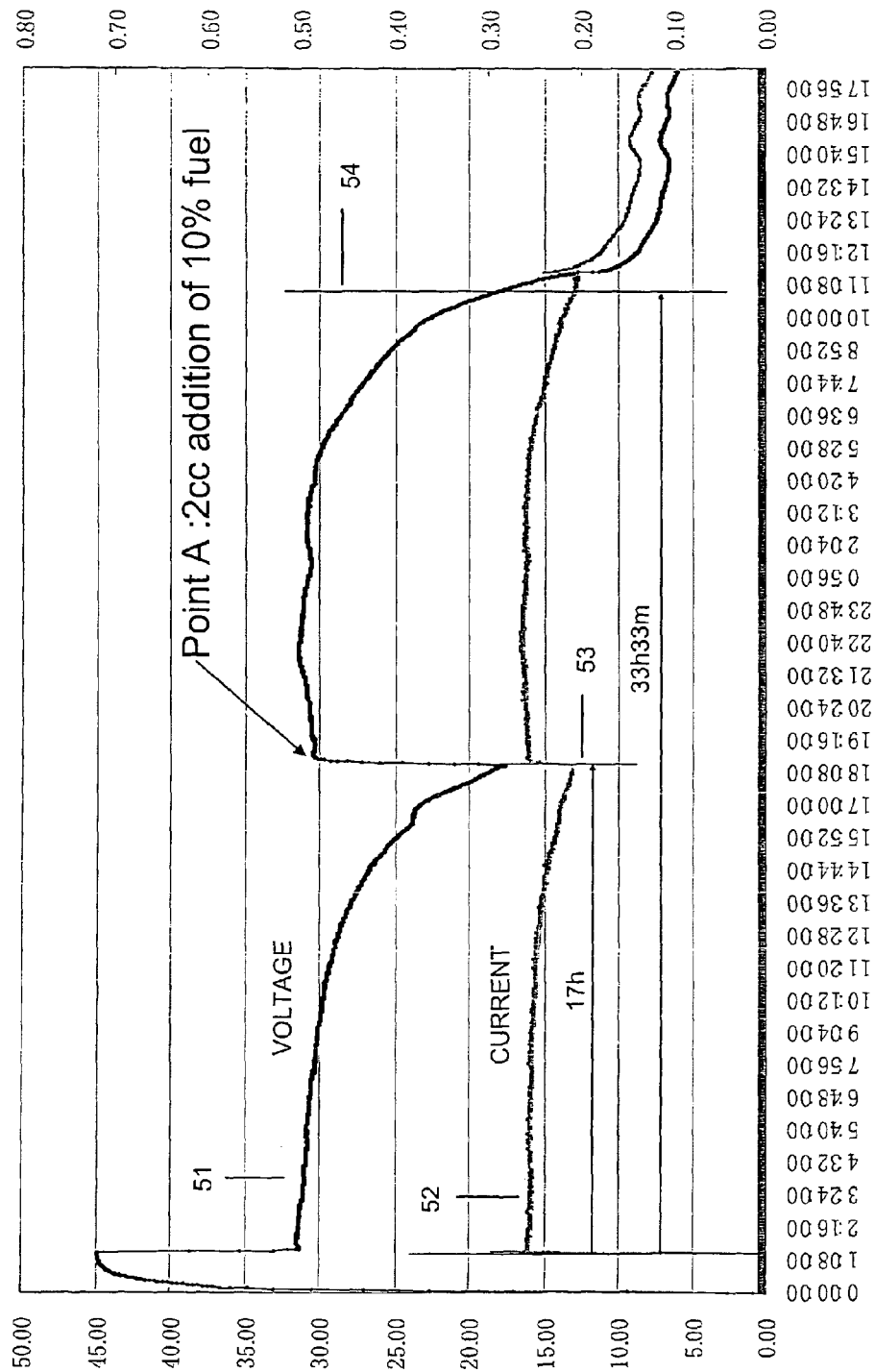

FUEL SUPPLY METHOD FOR DIRECT METHANOL FUEL CELL

This application claims priority from U.S. appl. No. 60/440,657 filed Jan. 15, 2003, which application is incorporated herein by reference for all purposes.

The invention relates generally to fuel cells and methods for use with fuel cells, and relates more particularly with direct methane fuel cells.

BACKGROUND

Most handheld consumer electronic devices, such as wireless telephones, notebook computers, and personal digital assistants (PDAs) are powered either by rechargeable batteries or by disposable batteries.

In the area of rechargeable batteries, historically nickel-cadmium batteries were used. More recently nickel-metal-hydride has been used and still more recently lithium-ion technology has been used. These shifts in battery chemistry have improved the power-to-weight ratio but nature imposes upper bounds on the energy density available in rechargeable batteries.

In the area of disposable batteries the chief technology employed presently is alkaline cells. Nature also imposes upper bounds on the available energy density for such cells.

Those who design handheld consumer electronic devices are thus faced with limits on battery life imposed in part by a desire to keep the devices from getting too heavy and large.

In recent years much attention has been paid to the prospect of employing fuel cells in a variety of applications including the powering of handheld consumer electronic devices. It seems possible that after various challenges are overcome, fuel cells may prove to be a useful power source for such applications. Fuel cells offer the possibility of a light-weight power source using inexpensive fuel, with fuel that is easy to refill.

There are, however, a number of challenges with present-day fuel cells. They run down. Refilling them can be a bother. It is not easy to extract all available energy from a given charge of fuel.

One fuel cell is called a direct methanol fuel cell (DMFC). In a DMFC, methanol is reacted with oxygen, one byproduct of which is water. As shown in FIG. 3, the methanol and oxygen flow toward a proton exchange membrane. Electrical power is derived from an anode and cathode juxtaposed with the membrane. Importantly, the "active fuel" area 2 in FIG. 3 is not filled with pure methanol but instead contains a solution of methanol in water. A typical methanol concentration is 3%.

DFMCs generate electricity through decomposition of methanol into hydrogen ions and electrons. Hydrogen ions propagate through the proton exchange membrane into the cathode area, while electrons reach the cathode through a load providing electricity in the process. Electrons reaching the cathode area recombine with hydrogen ions which in turn combine with oxygen supplied by the air to provide pure water as a byproduct.

Many investigators have attempted to devise suitable fuel cell structures, as shown for example in U.S. published application publication No. 20040001989 entitled "Fuel reservoir for liquid fuel cells" and publication No. 20020127141 entitled "Multiple-walled fuel container and delivery system." See also published international application with publication No. WO 03/094318 entitled "Device and method to expand operating range of a fuel cell stack."

As mentioned above, DMFCs are comparatively small and potentially suitable to be used in small electronic appliances. Key for such an adoption is further miniaturization, reduction in cost as well as improvements in the performance of the cell.

It would be extremely desirable to devise ways to improve DMFCs to perform better.

SUMMARY OF THE INVENTION

This invention addresses some of the key performance issues relating to the effectiveness of the fuel usage as well as the ease of use by the consumer and the integration of the technology with power management methods employed in portable computer and electronic devices. Toward this end a description is provided of the fuel storage apparatus to implement a fuel replenishment method. A description is provided of an apparatus to store a high-concentration methanol mixture (described hereon as cartridge). A mechanism is described that controls the opening and closure of the passage between the cartridge and the main fuel container in proportion to (or in response to) the output voltage of the cell.

An alternative mechanism is described that adjusts the methanol concentration in the main fuel container based on calculations of the remaining capacity of the cell. A manual method is described that can be actuated by the user to force replenishment when there is not enough power left to drive the automatic replenishment. A method is described to calculate remaining electric energy in the cell based on electric current (load current) and cell voltage measurements (See FIG. 1). Among other things this makes it easier to display the remaining capacity of a cell (e.g. a "smart cell"). It is possible to adjust the fuel concentration based on information provided by the electronics regarding the remaining fuel capacity.

In a direct methanol fuel cell, fuel efficiency is maintained by periodically adding a higher methanol concentration mixture through a cartridge into the primary fuel container. The cartridge replenishes methanol and partial water losses due to the consumption of fuel in the power generating process. In a typical system, the fuel replenishment mechanism is controlled through an electronic apparatus that monitors the power conversion process and is capable of predicting remaining operating capacity.

In situations where the cell voltage decreases below a critical threshold, (as determined from the cell output voltage), the destructive piercing of the cartridge is described in order to recover cell operation.

DESCRIPTION OF THE DRAWING

The invention is described with respect to a drawing in several figures.

FIG. 4 shows a DMFC using a recharging cartridge and a mini pump.

FIG. 5 shows the DMFC of FIG. 4 with the pump in operation.

FIG. 6 shows voltage and current for a DMFC in which more fuel is injected.

DETAILED DESCRIPTION

Figure 1:
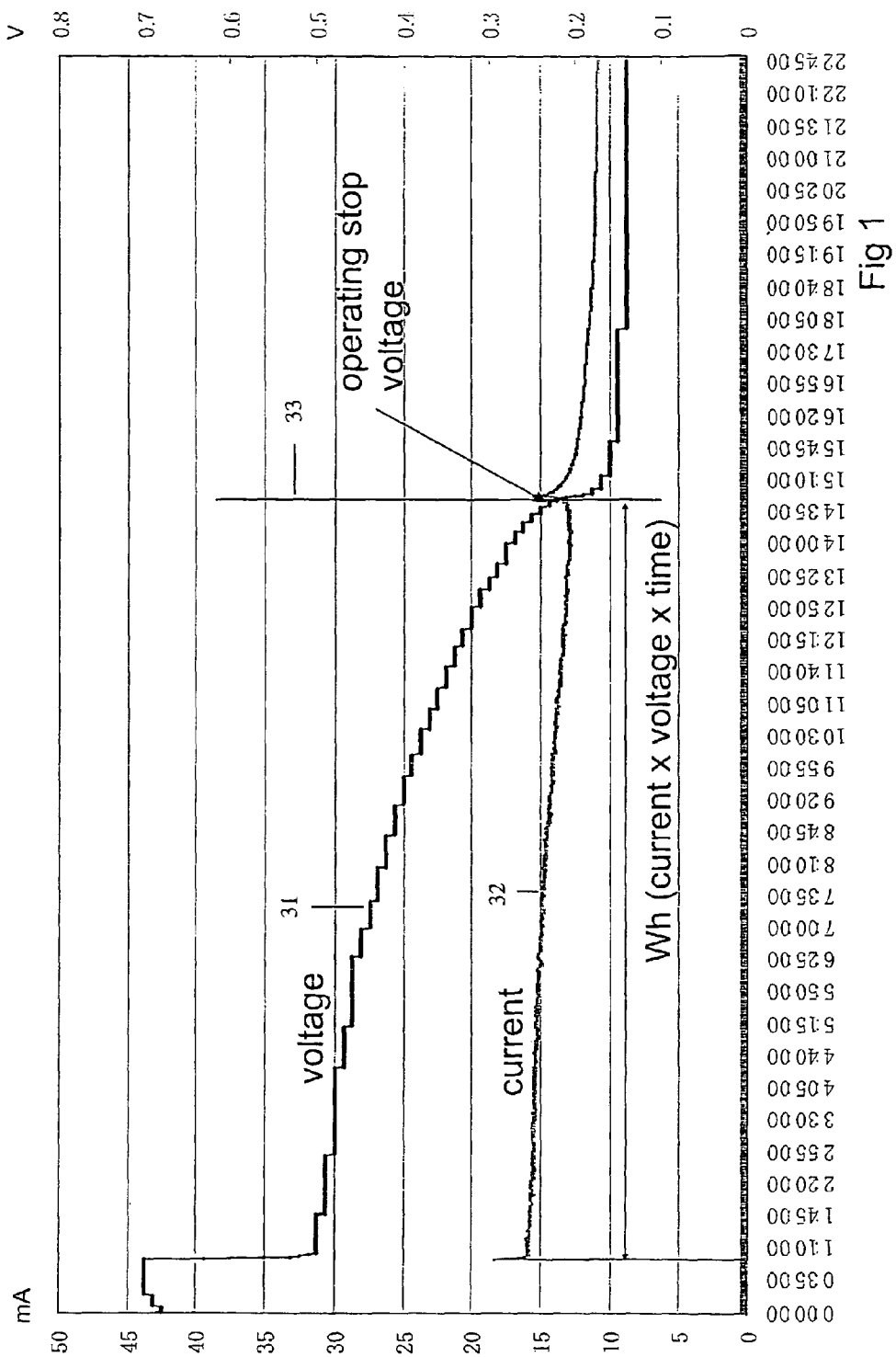
FIG. 1 shows voltage and current for a typical DMFC.

FIG. 1 shows voltage and current for a typical DMFC. The horizontal axis in this figure (and in FIGS. 2 and 6) is time in arbitrary units. The Y axis (in these three figures) shows voltage and current. In FIG. 1 a plot 31 shows a degradation of output voltage into a standard load. Plot 32 shows the available current. An abrupt event defining an operating stop voltage occurs at time 33, after which voltage is very low and of limited use. A small motor was used as a test load for the cells shown in these plots.

Importantly, the product of voltage and current can be integrated over time, defining a watt-hour capacity as shown in the figure. This watt-hour capacity is one of the important parameters that one seeks to optimize when working with fuel cells.

Figure 2:
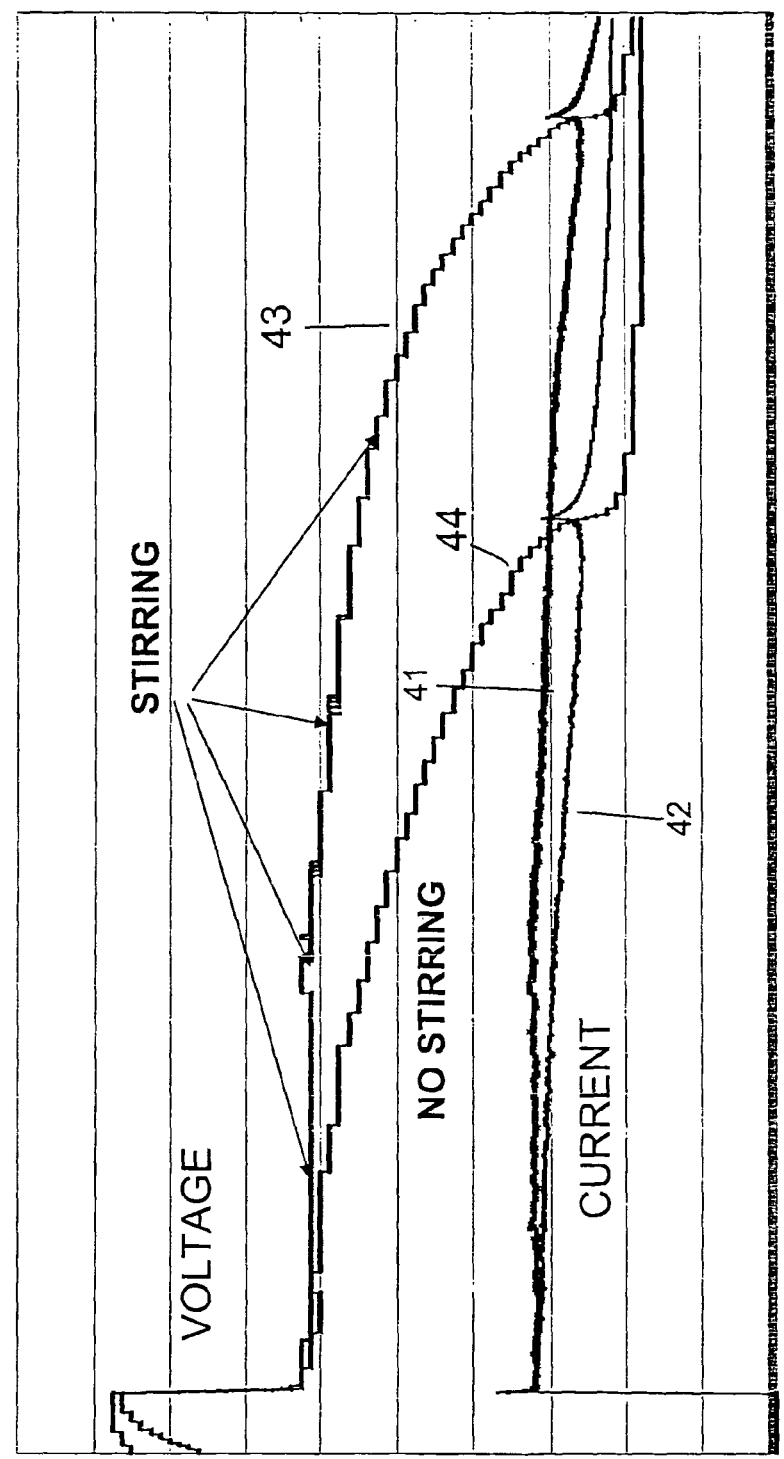
FIG. 2 shows voltage and current for a DMFC in which stirring is employed.

FIG. 2 illustrates the effect of stirring the fuel mixture in the performance of the cell. The effect of stirring is attributed by the authors to the fact that concentration of methanol in the anode area is constantly reduced because of its decomposition into hydrogen and carbon dioxide. Stirring achieves homogenous concentration in the container including the anode area. In FIG. 2, the results without stirring may be seen with voltage line 44 and current line 42. With stirring, the results are seen with voltage line 43 and current line 41. As will be appreciated, the total power generated (defined by the product of voltage and current, integrated over the production interval) is much greater with stirring than without.

The conclusion is that even when the fuel has originally optimal methanol concentration it cannot maintain it in the anode area without such assistance.

In one embodiment of the invention, then, a piezo-pump (or other stirrer means) is provided to circulate the fuel in order to provide constantly a maximum or nearly maximum possible methanol concentration in the anode area. Experience shows that it may not be needed to stir continuously. Instead, the stirring can be done at intervals. The frequency of the stirring depends on the size and the shape of the main fuel container. The stirrer may be a piezo pump such as that described below.

Figure 3:
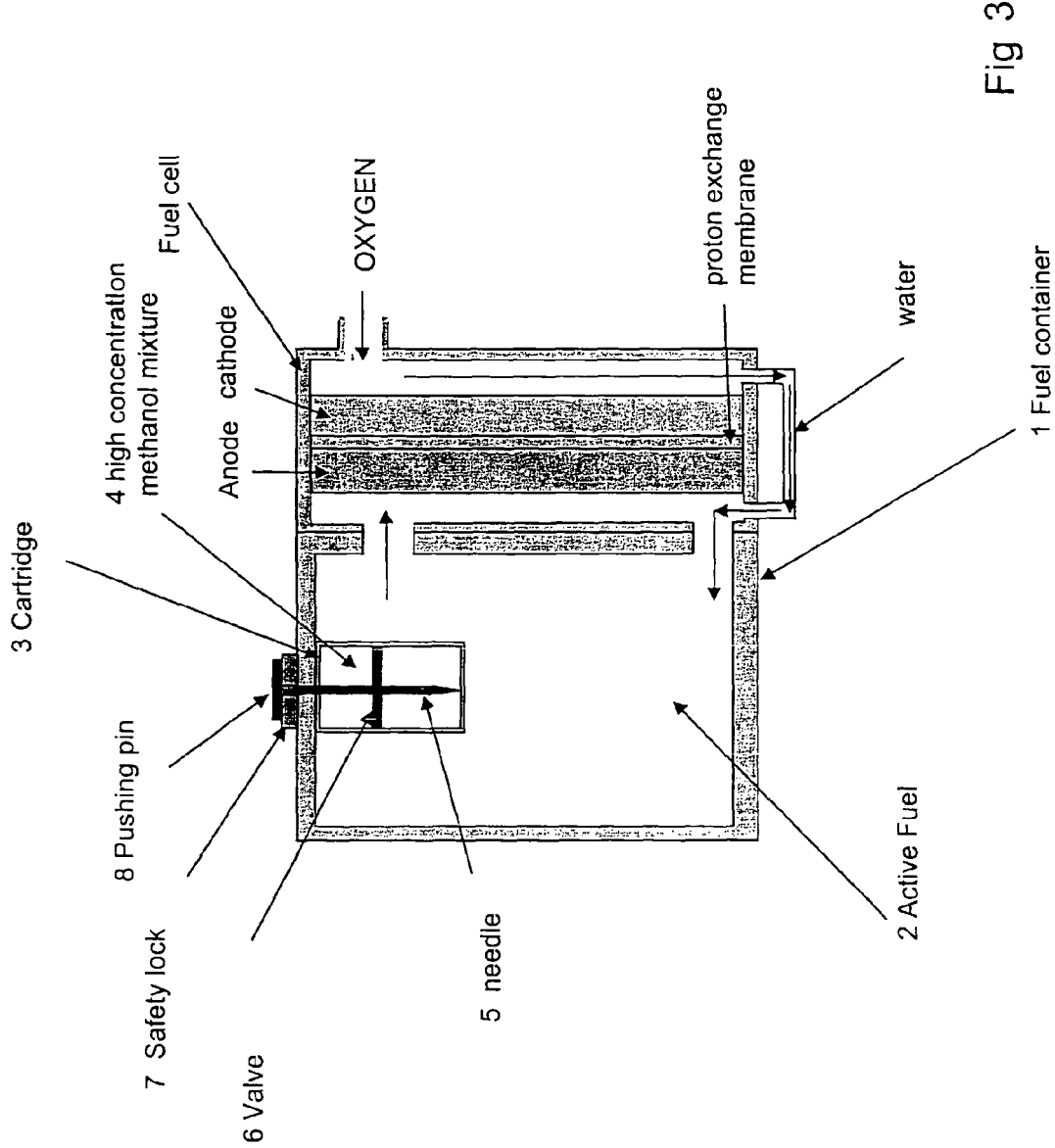
FIG. 3 shows a DMFC using a recharging cartridge and a pushing pin.

FIG. 3 presents another embodiment of the invention. In this embodiment, the prior-art parts of a DMFC can be seen—a fuel container 1, an active fuel location 2, a proton exchange membrane, an oxygen inlet, and an anode and cathode. Importantly, what is also provided is a cartridge 3 containing a high concentration methanol mixture, a valve 6, a pushing pin 8, and a safety lock 7. The safety lock 7 serves to prevent inadvertent pushing of the pushing pin 8.

When a critical threshold is determined either by the cell voltage or by calculating the remaining electrical power, the system issues an alert to the user. The user subsequently removes the safely lock 7 and pushes pushing pin 8. As a result of this action a needle 5 pierces the cartridge 3 enabling the mixture of high methanol concentration fluid 4 into the main container 1. As a result, the enriched fuel recovers the operation of the cell.

This method can be effective in implementations with a relatively small fuel canister, such as cellular phones. Using this method a single cartridge can double the power-generating ability of the cell.

FIGS. 4 and 5 present other embodiments of this invention. When the electronic apparatus (omitted for clarity in FIGS. 4 and 5) detects a critical low condition (either by voltage measurement of by remaining capacity calculations) it actuates a mini-pump 7, forcing a determined amount of high-methanol-concentration fluid from the cartridge 3 into the main fuel container 1. The fluid passes through a valve 5. The mini pump 7 contains a piezo device 6 which is driven by wiring 9 by a drive circuit, omitted for clarity in FIG. 4.

FIG. 5 highlights the operation of the mini-pump. In a typical arrangement a microcontroller 22 emits a pulse train 21 which moves the piezo device 6 back and forth. This pumps the fluid as shown by arrows 23.

A microcontroller 22 calculates the cell's remaining capacity based on cell voltage, temperature, etc., and determines the amount of time the pump 7 has to be activated each time.

The microcontroller 22 causes the piezo element 6 to vibrate for a specified amount of time restoring the methanol concentration in the main container 1.

The duty cycle of this operation is adjusted dynamically determined upon the volume of the main container 1 and the calculated fuel concentration at each time.

FIG. 6 shows actual measurements of a fuel cell benefiting from this invention. Plots 51 and 52 show voltage and current respectively. Seventeen hours pass during which power is readily available from the fuel cell. Then, before an operating stop voltage (see FIG. 1) is reached, at point A there is an addition of fuel. In this particular case 2 cubic centimeters (ccs) of a fluid comprising a 10% concentration of methanol is added to the fuel container 1. Stated differently, at point A, just prior to the motor stopping, 2 cc of a 10% methanol solution was added and stirred into the remaining fluid of the main container.

As may be seen, the voltage returns to a previous high level, as does the current through the standard load. The life of the cell is extended to more than thirty-three hours, nearly doubling the service life of the cell.

It should be noted that the determination of point A depends on the application and the load conditions. In addition the amount of fuel injection has to be determined accurately based on the volume of fluid in the main container, so the active fuel never exceeds the optimum concentration of 3%. The reason for this limit is that a higher-than-3% concentration of active fuel will cause rapid deterioration in the platinum used as a catalyst as well as in the proton exchange membrane.

It will be appreciated that if a different catalyst or a different proton exchange membrane were employed the limit on concentration might be different.

The method described above prolongs the operation of the fuel cell while preserving at the same time the useful life of the cell itself.

Looking at FIG. 6 we observe that the voltage of the cell recovers rapidly. This would not be the case if the replenishment fluid were not actively stirred into the main container 1.

In one embodiment, the DMFC fuel replenishment container (cartridge) 3 can be discarded after it is used in order to be replaced by a new cartridge 3. It is anticipated that this fuel replenishment method is the most convenient for the user, as it does not involve direct user contact with chemicals in order to refill the cell. One way to proceed in accordance with the invention is to provide cartridges with the correct methanol concentration to be used for a single load cycle.

This invention enables the use of the same cartridge for a much longer time, increasing the usage of the cell as well as reducing the cost of operating it.

Given the methanol concentration (solution of 3% typically) and the volume of the fuel, a theoretical calculation of the quantity of electricity that can be produced from a DMFC can be performed. The actual performance of the cell however is affected by dynamic parameters such as cell temperature, ambient temperature, load condition, etc. Effective determination of the cell's capacity can be estimated accurately by taking into consideration all these operating parameters along with the fuel condition.

It should be noted that in specific mobile applications such as cellular phones it may not be necessary to implement the micro pump mechanism because stirring occurs naturally as the user moves the equipment.

Those skilled in the art will have no difficulty devising myriad obvious improvements and variations upon the invention, all of which are intended to be within the scope of the claims which follow. Among other things, it is expected that the teachings of the invention benefit fuel cells other than DMFCs.

The invention claimed is:

1. Direct methanol fuel cell apparatus comprising:
   a fuel container;
   an anode adjacent the fuel container;
   a proton exchange membrane adjacent the anode;
   a cathode adjacent the proton exchange membrane;
   an oxygen supply adjacent the cathode;
   the fuel container containing methanol in water at a first concentration;
   a cartridge selectively communicatively coupled with the fuel container;
   the cartridge containing fluid comprising methanol in water at a second concentration, the second concentration higher than the first concentration,
   wherein the selective communicative coupling comprises a pushing pin by a human user, said pin puncturing the cartridge.

2. The apparatus of claim 1 wherein the second concentration is at least double the first concentration.

3. The apparatus of claim 2 wherein the second concentration is at least triple the first concentration.

4. A method for use with a direct methanol fuel cell, the method comprising the steps of:
   bringing a first solution of methanol in water at a first concentration into contact with an anode, the first solution contained within a container;
   bringing oxygen into contact with a cathode, the cathode adjacent a proton exchange membrane and the proton exchange membrane adjacent the anode;
   at a later time, bringing a cartridge into communicative coupling with the container, the volume of the container being greater than the volume of the cartridge, the cartridge containing a second solution of methanol in water at a second concentration, the second concentration higher than the first concentration,
   wherein the step of bringing the cartridge into communicative coupling with the container comprises a human user pushing a pin, said pin puncturing the cartridge.

5. The method of claim 4 wherein the second concentration is at least double the first concentration.

6. The method of claim 5 wherein the second concentration is at least triple the first concentration.

7. The apparatus of claim 1 further comprising a safety lock serving to prevent inadvertent pushing of the pin.

8. The apparatus of claim 1 further characterized in that the pin is movable in relation to the fuel container.

* * * * *